United States Patent
Tarbet

[15] 3,692,416
[45] Sept. 19, 1972

[54] CARRIER FOR AN INDIVIDUAL SAMPLE CELL

[72] Inventor: Cecil Sidney Charles Tarbet, Cambridge, England

[73] Assignee: Cecil Instrument Ltd., Cambridge, England

[22] Filed: Oct. 5, 1970

[21] Appl. No.: 78,122

[30] Foreign Application Priority Data

Oct. 7, 1969  Great Britain...........49161/69

[52] U.S. Cl. .................................................356/244
[51] Int. Cl. ...................................................G01n 1/28
[58] Field of Search ..........350/92, 95; 356/244, 246; 206/73, 77; 220/22.2, 22.3, 22.4, 22.6

[56] References Cited

UNITED STATES PATENTS

| 2,200,053 | 5/1940 | Brown et al.............350/95 X |
| 3,501,242 | 3/1970 | Demey et al.............356/246 |
| 3,503,665 | 3/1970 | Carter.........................350/95 |

*Primary Examiner*—Ronald L. Wibert
*Assistant Examiner*—Orville B. Chew, II
*Attorney*—Hall & Houghton

[57] ABSTRACT

A sample cell carrier receives an optical sample cell directly in a pre-determined alignment, and is inserted without intermediate parts into a carrier slide.

14 Claims, 7 Drawing Figures

PATENTED SEP 19 1972

INVENTOR
CECIL S.C. TARBET,
BY
ATTORNEY

CARRIER FOR AN INDIVIDUAL SAMPLE CELL

This invention relates to a carrier for an individual sample cell for optical equipment.

According to the present invention a carrier for an individual sample cell in optical equipment comprises a support plate against which one face of a rectangular sample cell may be engaged and including stops for the location of two faces of the cell adjacent to the said one face to determine the position of the cell along three co-ordinate axes, and a leaf spring secured to the plate to extend generally parallel to the plane thereof to hold a sample cell inserted between the spring and the plate firmly against the latter.

Conveniently one edge of the plate is flanged to provide support and location between a cell, and an adjacent edge is formed with lugs to locate an adjacent cell edge. The lugs may be constituted by pressed-out portions of the plate. The flange may include a portion extending at right angles to the plane of the plate. In one embodiment of the invention, the spring may be slit to define corresponding retaining and location portions, so that one part of the spring grips the cell against the plate while the second part of the spring slips behind the rear face of the cell. Conveniently the slit in the spring extends parallel to the lugs when these are provided. Multiple slits may be formed in the spring to correspond to cells of various path lengths.

The carrier is normally used in combination with a multi-position cell slide, and interengaging locating means may be provided to simplify registration. Also, the leaf spring may be adapted to locate the carrier and cell correctly in the compartments of the slide.

Preferably the slide is open-topped to facilitate insertion and removal of the carriers, and a lip may then be provided for reasons of light exclusion.

The invention will now be described in greater detail with reference to the accompanying drawings of which:

Figure 1:
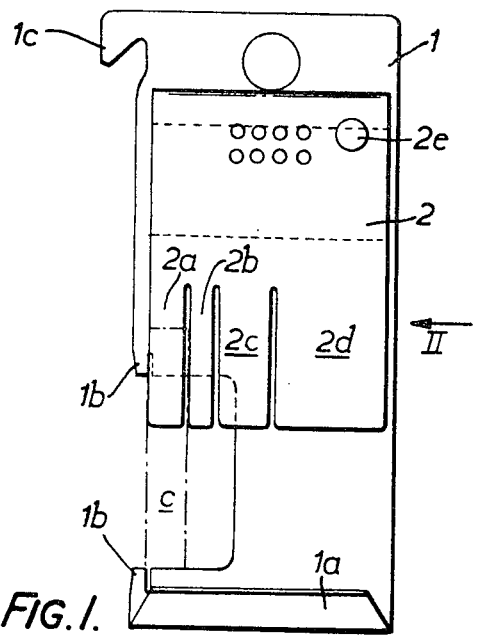
FIG. 1 is a side view of a sample carrier constructed in accordance with the invention.
Figure 2:
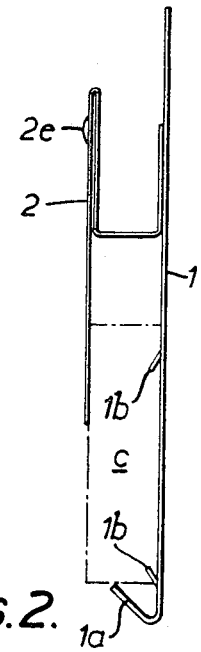
FIG. 2 is an end view taken on the direction of the arrow II in FIG. 1.
Figure 6:
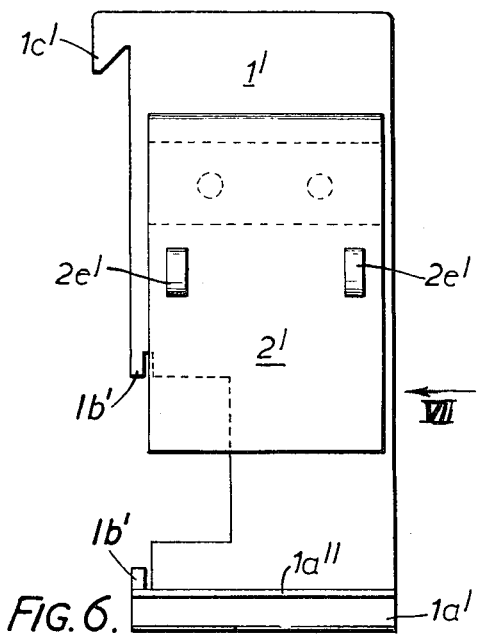
Figure 7:
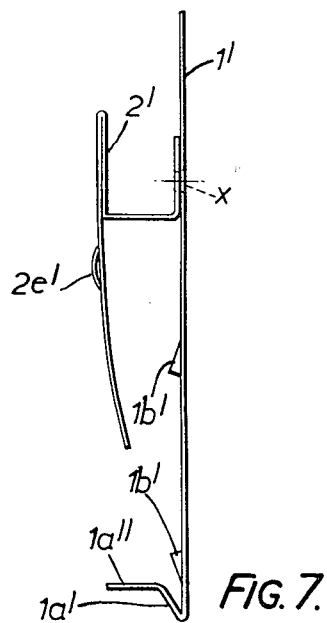

and with reference to FIGS. 6 and 7, which are views of a second embodiment of a second sample carrier in accordance with the invention, corresponding to FIGS. 1 and 2.

The cell carrier illustrated in FIGS. 1 and 2 comprises a support plate 1 having its lower end 1a bent upwardly to form a flange and formed on one edge with a pair of lugs 1b bent in the same direction as the flange 1a. The upper end of the support plate is formed at one edge of the plate with a downwardly depending hook 1e for location purposes. A leaf spring 2 of phosphor-bronze material is spot-welded to the plate 1 so that its body lies in parallel spaced relation to the plate. The distance between the spring and the plate is sufficient to accomodate a sample cell C. The spring is slit upwardly to the line of the lugs 1b to form a number of tongues 2a . . . 2d. It will be seen that when the cell C is located against the flange 1a and the lugs 1b it is retained against the plate by the tongue 2a while the tongue 2b slides behind the rear face of the cell to prevent its movement away from the lugs. The multiple tongues permit the use of sample cells of different path lengths while maintaining the dual gripping and locating function of the spring. A protuberance 2e seen at the upper end of the leaf spring enables a single spring to act also to locate the carrier in a sample slide as will be described below.

Figure 4:
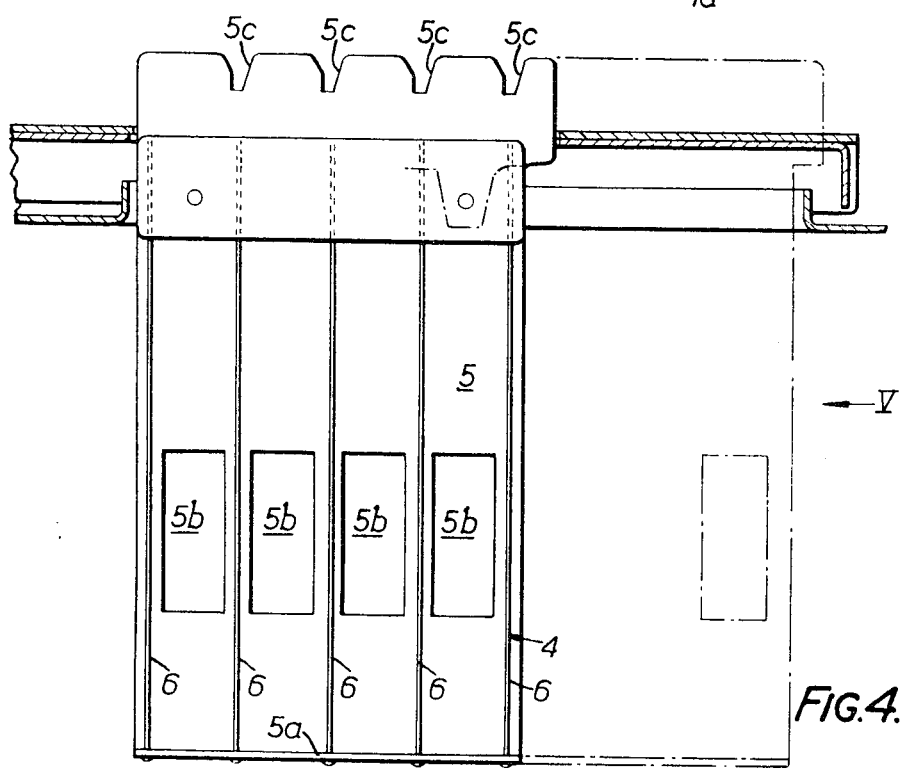
FIG. 4 is a side view, partly in section taken on the direction of the arrow IV in FIG. 3.
Figure 3:
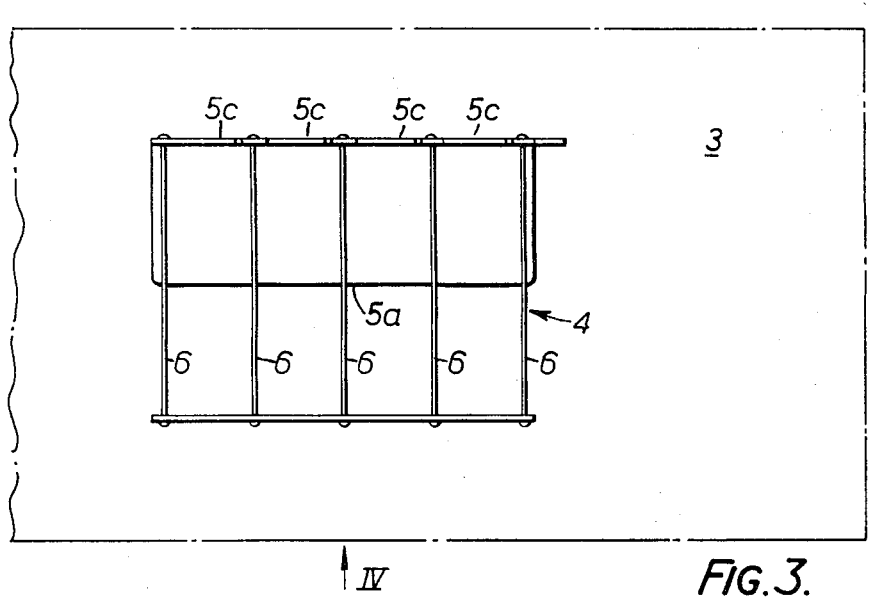
FIG. 3 is a plan view of a multi-position cell slide for use in conjunction with the carrier of FIGS. 1 and 2.
Figure 5:
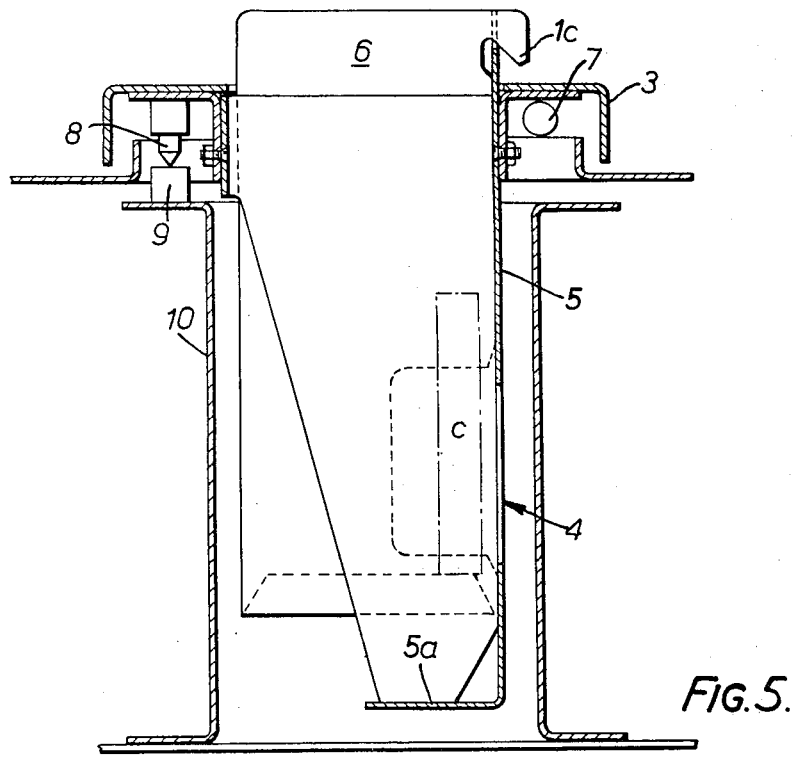
FIG. 5 is an end view, again partly sectioned, taken on the direction of the arrow V in FIG. 4, and showing the location of a carrier in the slide.

The slide illustrated in FIGS. 3 to 5 of the drawings consists of a top plate 3 of shallow channel form, which supports a carrier-receiving basket 4. This basket consists of a back plate 5 having a normally extending base portion 5a, dividers 6 being provided to sub-divide the basket into four compartments. Each compartment includes an aperture 5b in the back plate 5 for the passage of light and the member 5 projects above the plate of the member 3 and is slotted at 5c to provide for locating engagement with the portions 1c of corresponding cell carriers. In use, as shown in FIG. 5, a cell carrier can be inserted into the slide from above, until the portion 1c is fully engaged in a corresponding slot 5c, The cell C is then held in the correct relationship with the remainder of the equipment in which the slide is installed. The slide is provided with the normal traversing rod 7 and with a detent 8 which traverses a notched block 9 secured to the housing 10 of the machine to index the traversing movement of successive apertures 5b across the optical path of the instrument.

FIGS. 6 and 7 illustrate a modified form of cell carrier which has been developed as an alternative to the carrier illustrated in the earlier figures. The reference numbers in FIG. 6 and 7 correspond to those used in the earlier figures, with the addition of indices, and a complete description is unnecessary. The principal points of difference are firstly that the spring 2' is riveted to the support plate 1' instead of being spot-welded, secondly that the spring 2' is not slotted, thirdly that the protuberance 2e is replaced by two bowed portions 2e' separated from the main body of the spring 2' by corresponding parallel slits, and fourthly that the flange 1a' is extended at 1a'' to provide an extended platform to support the sample cell. The general method of use of the modified sample cell carrier, is its co-operation with the basket and is identical with that described with reference to the first embodiment. It will be appreciated that any one or more of the points referred to above could be employed separately in the first embodiment.

The carrier illustrated in FIGS. 6 and 7 is used in conjunction with a cell slide similar to that shown in FIGS. 3–5, but without the slots 5c. It has been found that the bowed portions 2e' of the spring 2' are sufficient to give adequate lateral registration of the carrier within the slide.

It will be seen that the carriers described above enable a sample cell to be accurately but simply positioned in the interior of optical apparatus by direct access from outside the apparatus. Furthermore, the number of loose parts necessary for operation is kept to a minimum. Light leakage into the apparatus can be dealt with by means of a simple covering lid, which can be hinged to the apparatus to avoid loss.

I claim:

1. A sample cell carrier comprising:
   a. a support plate, said support plate having as elements
      1. a flat cell-engaging surface,
      2. a first stop means, and
      3. a second stop means, said elements defining abutments positioned for engaging three adjacent and orthogonal faces of a rectangular sample cell, and said sample cell carrier further comprising
   b. a cell retaining leaf spring, said leaf spring being
      1. secured to said plate and
      2. extending in generally parallel spaced relation to said surface.
2. A sample cell carrier as claimed in claim 1 wherein said leaf spring is slit thereby defining corresponding cell-retaining and cell-locating regions thereof.
3. Apparatus of the class described including a receptacle containing at least one sample cell carrier as claimed in claim 1.
4. Apparatus as claimed in claim 3 wherein said receptacle is a multi-position cell slide.
5. Apparatus as claimed in claim 4 wherein said slide is open-topped.
6. Apparatus as claimed in claim 5 wherein said slide is provided with a removable light-excluding lid.
7. A sample cell carrier as claimed in claim 2, wherein said leaf spring is slit at a plurality of locations therein.
8. A sample cell carrier as claimed in claim 1, wherein said plate has a flange projecting from one of its edges and constituting said first stop means, and a pair of lugs extending from an adjacent one of its edges and constituting said second stop means.
9. A sample cell carrier as claimed in claim 8, wherein said plate has pressed out portions constituting said lugs.
10. A sample cell carrier as claimed in claim 8, wherein said flange has a flat portion lying perpendicular to said surface.
11. A sample cell carrier as claimed in claim 1, wherein said carrier further comprises carrier locating means positioned for engagement with a cell slide.
12. A sample cell carrier as claimed in claim 1, wherein said leaf spring further comprises abutment means engageable with a cell slide.
13. A sample cell carrier as claimed in claim 12, wherein said abutment means comprises a domed protuberance.
14. A sample cell carrier as claimed in claim 12, wherein said abutment means comprises at least one bowed portion defined by corresponding slits.

* * * * *